(12) United States Patent
Aicken

(10) Patent No.: US 11,890,969 B2
(45) Date of Patent: Feb. 6, 2024

(54) SEAMLESS SEAT CUSHION EXTENSION ASSEMBLY AND METHOD

(71) Applicant: Volvo Car Corporation, Gothenburg (SE)

(72) Inventor: Richard Aicken, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/706,694

(22) Filed: Mar. 29, 2022

(65) Prior Publication Data

US 2022/0305961 A1 Sep. 29, 2022

Related U.S. Application Data

(60) Provisional application No. 63/167,345, filed on Mar. 29, 2021.

(51) Int. Cl.
| | |
|---|---|
| *B60N 2/02* | (2006.01) |
| *B60N 2/809* | (2018.01) |
| *B60N 2/22* | (2006.01) |
| *B60N 2/806* | (2018.01) |
| *B60N 2/58* | (2006.01) |

(52) U.S. Cl.
CPC ............. *B60N 2/0284* (2013.01); *B60N 2/22* (2013.01); *B60N 2/58* (2013.01); *B60N 2/806* (2018.02); *B60N 2/809* (2018.02)

(58) Field of Classification Search
CPC .............................. B60N 2/0284; B60N 2/809
See application file for complete search history.

(56) References Cited

U.S. PATENT DOCUMENTS

| | | | |
|---|---|---|---|
| 2008/0157577 A1* | 7/2008 | Lindsay | B60N 2/0224 297/284.11 |
| 2008/0157578 A1* | 7/2008 | Snyder | B60N 2/0284 297/311 |
| 2013/0320730 A1* | 12/2013 | Aselage | B60N 2/0284 297/337 |

(Continued)

FOREIGN PATENT DOCUMENTS

| | | | |
|---|---|---|---|
| DE | 102009019031 A1 * | 10/2010 | B60N 2/0232 |
| DE | 102012101433 A1 * | 8/2013 | B60N 2/0284 |

(Continued)

*Primary Examiner* — Timothy J Brindley
(74) *Attorney, Agent, or Firm* — Clements Bernard Walker; Christopher L. Bernard

(57) ABSTRACT

An extendable seat base for a seat of a vehicle is disclosed. The seat base includes an outer cushion, a cord, and a motor. The outer cushion forms a top of the seat base and extends, in one unitarily formed piece, down a front of the seat base and back underneath or within the seat base, such that excess material of the outer cushion is positioned underneath or within the seat base. The cord is connected to an end of the outer cushion at the excess material. The motor is adapted to pull the excess material underneath or within the seat base while the seat base is in a retracted position and to release the excess material while the seat base is in an extended position. At least a portion of the excess material is used to form part of an extended seat for a vehicle occupant while the seat base is in the extended position.

19 Claims, 10 Drawing Sheets

(56) References Cited

U.S. PATENT DOCUMENTS

| | | | |
|---|---|---|---|
| 2014/0203607 A1* | 7/2014 | Line | B60N 2/0224 |
| | | | 297/311 |
| 2017/0113578 A1* | 4/2017 | Shiraishi | B60N 2/80 |
| 2019/0100117 A1* | 4/2019 | Vanfossen | B60N 2/62 |
| 2019/0160984 A1* | 5/2019 | Hickman Guevara | |
| | | | B60N 2/809 |
| 2019/0184858 A1* | 6/2019 | Anzenberger | B60N 2/686 |
| 2019/0217745 A1* | 7/2019 | Tsukamoto | B60N 2/5825 |
| 2019/0241103 A1* | 8/2019 | Sala | B60N 2/0224 |
| 2021/0114496 A1* | 4/2021 | Tait | B60N 2/62 |
| 2023/0129527 A1* | 4/2023 | Kimbara | B60N 2/0284 |
| | | | 297/284.1 |

FOREIGN PATENT DOCUMENTS

| | | | | |
|---|---|---|---|---|
| DE | 102018123873 A1 * | 3/2019 | | B60N 2/0284 |
| DE | 102018100425 A1 * | 7/2019 | | |
| DE | 202019105528 U1 * | 12/2019 | | |
| EP | 3763560 A1 * | 1/2021 | | B60N 2/0284 |

* cited by examiner

SEAMLESS SEAT CUSHION EXTENSION ASSEMBLY AND METHOD

CROSS-REFERENCE TO RELATED APPLICATION

The present disclosure claims the benefit of priority of U.S. Provisional Patent Application No. 63/167,345, filed on Mar. 29, 2021, and entitled "SEAMLESS SEAT CUSHION EXTENSION," the contents of which are incorporated in full by reference herein.

TECHNICAL FIELD

The present disclosure generally relates to vehicle seats. More particularly, the present disclosure relates to a vehicle seat with a seamless seat cushion extension, as well a related method of manufacture.

BACKGROUND

Traditional seat cushion extensions for vehicle seats utilize a separate part that is separated from the main seat cushion and translated to selectively increase the effective size and coverage of the seating area. These seat cushions typically use mechanical sliders that include several moving parts that slide in and out to effectively extend the seat cushion. This results in a seat cushion that has a split line or gap between the main seat cushion and the seat cushion extension.

The above-described background relating to seat cushions and the extension thereof is merely intended to provide a contextual overview of and is not intended to be all-encompassing or limiting in any manner. Other contextual information may become apparent to those of ordinary skill in the art upon review of the following description of exemplary embodiments.

SUMMARY

The present disclosure generally provides a seamless seat cushion extension for a vehicle seat. In particular, the seat cushion extension utilizes a motor that selectively pulls a wire to retract an extension portion of the seat cushion, and, in particular, to pull both the interior foam and the cover material of the extension portion of the seat cushion. The retracted extension portion is then disposed underneath a portion of the vehicle seat, such as in a lower shell of the vehicle seat. To extend the seat cushion utilizing at least part of the extension portion, the wire is released and a spring loaded side capping and support rod moves the seat cushion out for extension thereof.

In one exemplary embodiment, the present disclosure provides a seat base for a seat of a vehicle, the seat base including: an outer cushion forming a top of the seat base extending, in one unitarily formed piece, down a front of the seat base and back underneath or within the seat base, such that excess material of the outer cushion is disposed underneath or within the seat base; and a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration. The seat base further includes a cover disposed about the outer cushion forming, at least in part, a seating surface for the vehicle occupant. Optionally, the cover includes one unitarily formed piece. The mechanism includes: a cord connected directly or indirectly to an end of the outer cushion at the excess material; and a motor adapted to pull or release the cord and thereby pull the excess material in the retracted configuration or release the excess material in the extended configuration. The seat base further includes a shell disposed underneath at least a back portion of the outer cushion and a side capping member disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion. The side capping members are biased away from the shell in the extended configuration of the seat base by one or more spring members. Optionally, the mechanism includes: a cord connected to a crossbar coupled between the side capping members; and a motor adapted to pull or release the cord and thereby pull the excess material in the retracted configuration or release the excess material in the extended configuration as the side capping members are translated.

In another exemplary embodiment, the present disclosure provides a seat of a vehicle, the seat including: a seat base, including: an outer cushion forming a top of the seat base extending, in one unitarily formed piece, down a front of the seat base and back underneath or within the seat base, such that excess material of the outer cushion is disposed underneath or within the seat base; and a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration; a backrest pivotably coupled to the seat base; and a headrest extendably coupled to the backrest. The seat base further includes a cover disposed about the outer cushion forming, at least in part, a seating surface for the vehicle occupant. Optionally, the cover includes one unitarily formed piece. The mechanism includes: a cord connected directly or indirectly to an end of the outer cushion at the excess material; and a motor adapted to pull or release the cord and thereby pull the excess material in the retracted configuration or release the excess material in the extended configuration. The seat base further includes a shell disposed underneath at least a back portion of the outer cushion and a side capping member disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion. The side capping members are biased away from the shell in the extended configuration of the seat base by one or more spring members. Optionally, the mechanism includes: a cord connected to a crossbar coupled between the side capping members; and a motor adapted to pull or release the cord and thereby pull the excess material in the retracted configuration or release the excess material in the extended configuration as the side capping members are translated.

In a further exemplary embodiment, the present disclosure provides a method for manufacturing a seat base for a seat of a vehicle, the method including: providing an outer cushion forming a top of the seat base extending, in one unitarily formed piece, down a front of the seat base and back underneath or within the seat base, such that excess material of the outer cushion is disposed underneath or within the seat base; providing a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration; and disposing a cover about the outer cushion forming, at least in part, a seating surface for the vehicle occupant. Optionally, the cover includes one unitarily formed piece. The mechanism includes: a cord connected directly or indirectly to an end of the outer cushion at the excess material; and a motor adapted to pull or release the cord and thereby pull the excess material in the retracted configuration or release the excess material in the extended configuration. The method further includes providing a shell disposed underneath at least a back portion of the outer cushion and a side capping member disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion. The side capping members are biased away from the shell in the extended configuration of the seat base by one or more spring members. Optionally, the mechanism includes: a cord connected to a crossbar coupled between the side capping members; and a motor adapted to pull or release the cord and thereby pull the excess material in the retracted configuration or release the excess material in the extended configuration as the side capping members are translated.

In a still further exemplary embodiment, the mechanism includes: a shell disposed underneath at least a back portion of the outer cushion and a side capping member disposed on either side of a front portion of the outer cushion, wherein the side capping members are each coupled to the shell via a slider member enabling the side capping members to translate towards and away from the shell, and wherein the side capping members are coupled to each other via a crossbar and a support rod each disposed through an interior space defined by the outer cushion; an actuator coupled to the crossbar and adapted to translate the side capping members and the support rod towards and away from the shell within the outer cushion; and an elastic member connected directly or indirectly to an end of the outer cushion at the excess material and adapted bias the excess material towards the shell in all configurations, thereby pulling the excess material underneath or within the seat base when the seat base is in any configuration, to a greater or lesser extent.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

Again, the present disclosure generally provides a seamless seat cushion extension for a vehicle seat. In particular, the seat cushion extension utilizes a motor that selectively pulls a wire to retract an extension portion of the seat cushion, and, in particular, to pull both the interior foam and the cover material of the extension portion of the seat cushion. The retracted extension portion is then disposed underneath a portion of the vehicle seat, such as in a lower shell of the vehicle seat. To extend the seat cushion utilizing at least part of the extension portion, the wire is released and a spring loaded side capping and support rod moves the seat cushion out for extension thereof.

Figure 1:
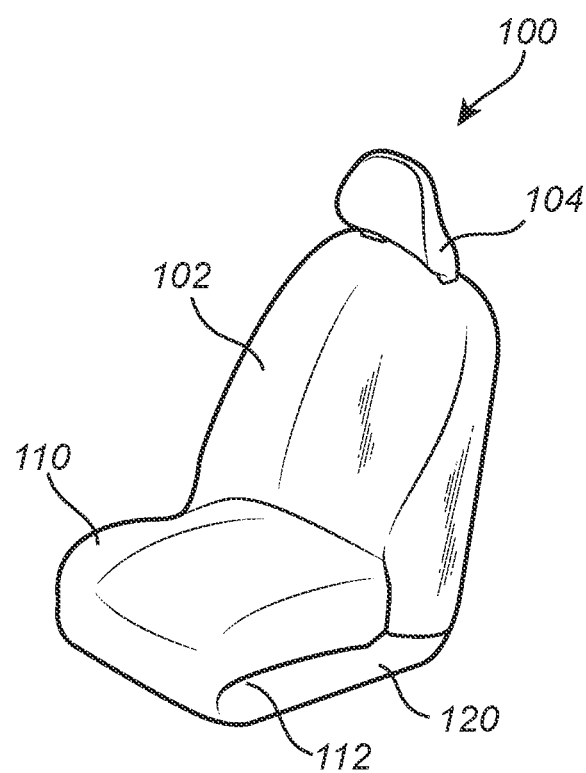
FIG. 1 is a schematic illustration of a vehicle seat including the extendable seat base of the present disclosure.

FIG. 1 is a schematic illustration of a vehicle seat 100 including the extendable seat base 110 of the present disclosure. Referring now specifically to FIG. 1, in one illustrative embodiment, the vehicle seat 100 includes the extendable seat base 110, a backrest 102, and a headrest 104, the latter of which are well known to those of ordinary skill in the art. Each of the extendable seat base 110, the backrest 102, and the headrest 104 include a cushion (not illustrated here) and a cover 112 adapted to protect the underlying cushion. As will be described in greater detail herein below, the extendable seat base 110 is selectively extendable to provide further support for an occupant's legs, in particular, for occupants with longer legs.

Figure 2:
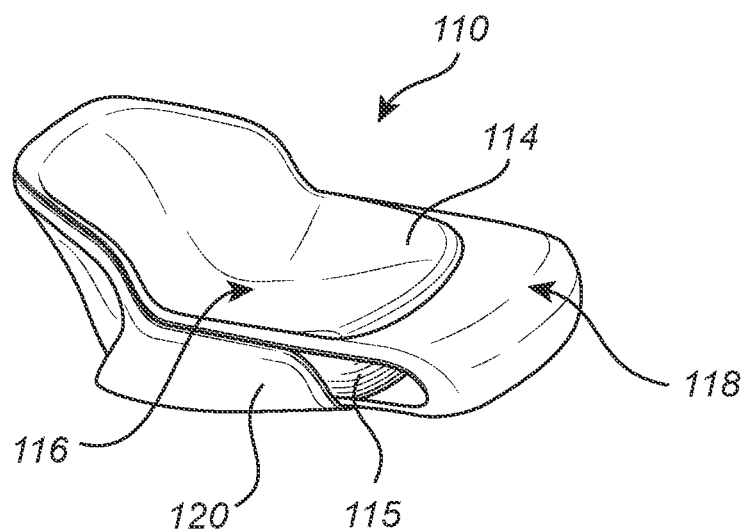
FIG. 2 is a perspective view of one illustrative embodiment of the extendable seat base of the present disclosure.
Figure 3:
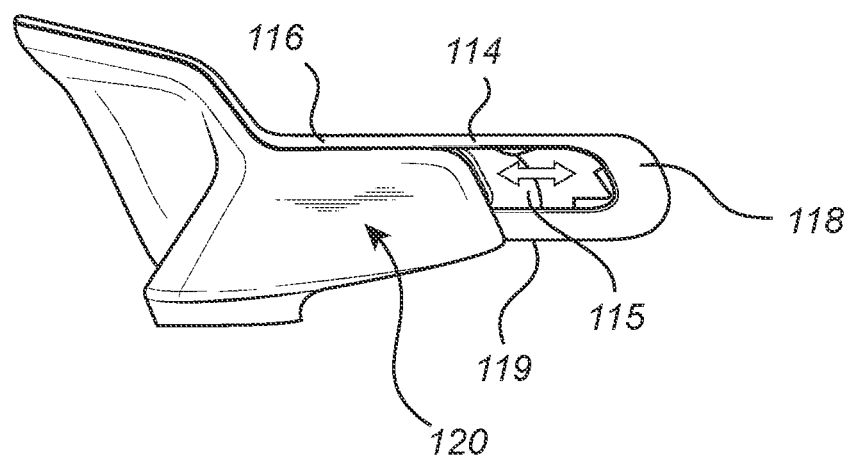
FIG. 3 is a side perspective view of the extendable seat base of FIG. 2 of the present disclosure.

FIG. 2 is a perspective view of one illustrative embodiment of the extendable seat base 110 of the present disclosure. FIG. 3 is a side perspective view of the extendable seat base 110 of FIG. 2 of the present disclosure. Referring now specifically to FIGS. 2 and 3, in one illustrative embodiment, the extendable seat base 110 includes a lower shell 120 and one or more cushions 114, 115. The lower shell 120 provides support for the one or more cushions 114, 115 and is adapted to connect the extendable seat base 110 to an underlying frame or assembly (not illustrated here for clarity) and, ultimately, the vehicle frame (also not illustrated here for clarity). In the embodiment illustrated in FIGS. 2 and 3, the extendable seat base 110 includes an outer cushion 114 and at least one an inner cushion 115. The at least one inner cushion 115 is positioned between the lower shell 120 and the outer cushion 114. The outer cushion 114 includes a base portion 116 and an extension portion 118. The base portion 116 is positioned, in part, over the at least one inner cushion 115, while the extension portion 118 extends forward from the base portion 116 and wraps down and back to the lower shell 120. The extension portion 118 includes excess material 119 that extends below the inner cushion 115 and into or below the lower shell 120. As can be seen in FIGS. 2 and 3, the excess material 119 of the outer cushion 114 is pulled out to span a gap between the extension portion 118 and the inner cushion 115, which extends a length of the extendable seat base 110.

As can be seen in FIGS. 2 and 3, and as further illustrated in FIGS. 5 and 6 described herein below, in embodiments, the outer cushion 114 is a unitarily formed structure that does not have any seams therein, which extends across a top of the seat base 110, down a front of the seat base 110, and then back underneath the seat base 110. Similarly, in embodiments, the cover 112 (FIG. 1) of the seat base 110 is positioned over the outer cushion 114 and is also a unitarily formed structure that does not include any seams and which also extends across a top of the seat base 110, down a front of the seat base 110, and then back underneath the seat base 110. As such, in embodiments of the present disclosure, a smooth, seamless surface is formed in and on the seat base 110, which does not wrinkle and provides comfort for the vehicle occupant, no matter the occupant's height and no matter the configuration of the seat base 110. FIG. 3 specifically illustrates the extension and retraction of the extension portion 118 of the outer cushion 114 and the seat base 110 from and to the base portion 116 of the outer cushion 114 and the eat base 110, with the associated deployment and storage of the excess material 119 of the extension portion from and in the lower shell 120.

Figure 4:
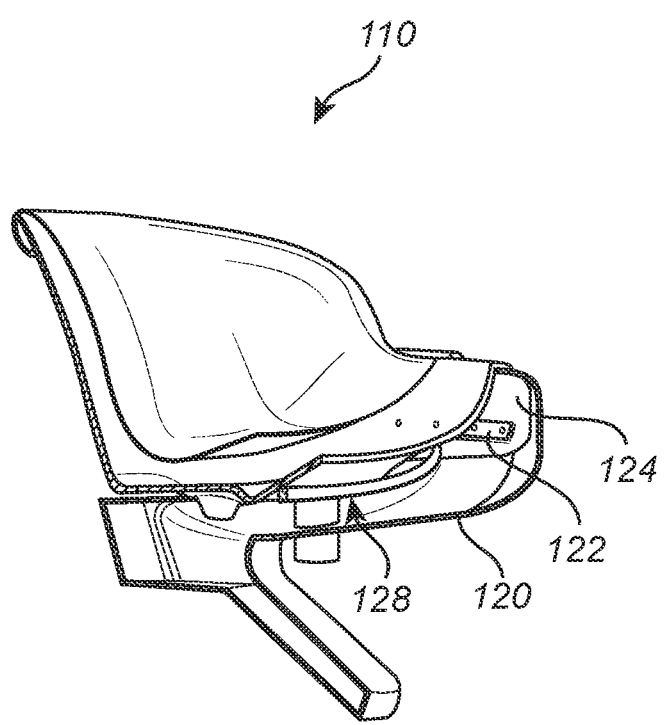
FIG. 4 is a cutaway perspective view of the extendable seat base of FIGS. 2 and 3 of the present disclosure.

FIG. 4 is a cutaway perspective view of the seat base of FIGS. 2 and 3 of the present disclosure. Referring now specifically to FIG. 4, the seat base 110 also includes side capping 124 and one or more sliders 122. The side capping 124 is connected to the one or more sliders 122, which allows the side capping 124 to move forward in an extension configuration of the seat base 110 and to be pulled backward when the seat base 110 is in a standard/retracted configuration of the seat base 110. In the embodiment illustrated, the seat base also includes a cable connecting crossbar 128 that extends across the seat base 110 between the side capping 124 on each side of the seat base 110. In this manner, the side capping 124 is enabled to extend and retract with the extension and retraction of the extension portion 118 (FIGS. 2 and 3) of the outer cushion 114 (FIGS. 2 and 3) and the seat base 110.

Figure 5:
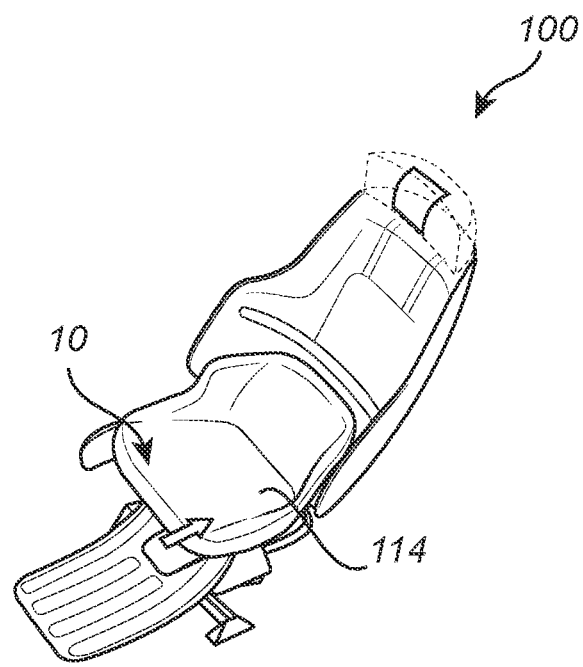
FIG. 5 is a perspective view of one illustrative embodiment of the vehicle seat of the present disclosure showing the vehicle seat in a retracted state.
Figure 6:
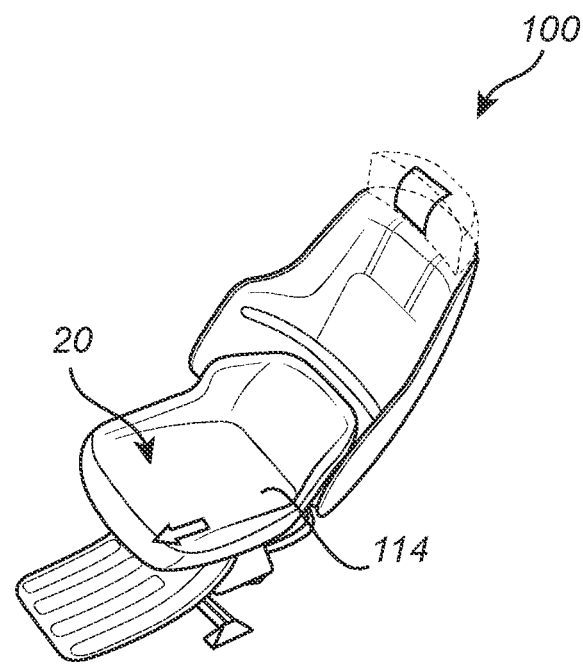
FIG. 6 is a perspective view of one illustrative embodiment of the vehicle seat of the present disclosure showing the vehicle seat in an extended state.

FIG. 5 is a perspective view of one illustrative embodiment of the vehicle seat 100 of the present disclosure showing the vehicle seat 100 in a retracted state 10. FIG. 6 is a perspective view of one illustrative embodiment of the vehicle seat 100 of the present disclosure showing the vehicle seat 100 in an extended state 20. Referring now to FIGS. 5 and 6, the seat base 110 is adapted to transition between a retracted state, which, in embodiments, is a standard position with a shorter length of the seat base 110, and an extended condition, which can have a variety of lengths for the seat base 110 based on an amount of excess material 119 that is made available for the outer cushion 114 and the cover 112 (FIG. 1).

Figure 7:
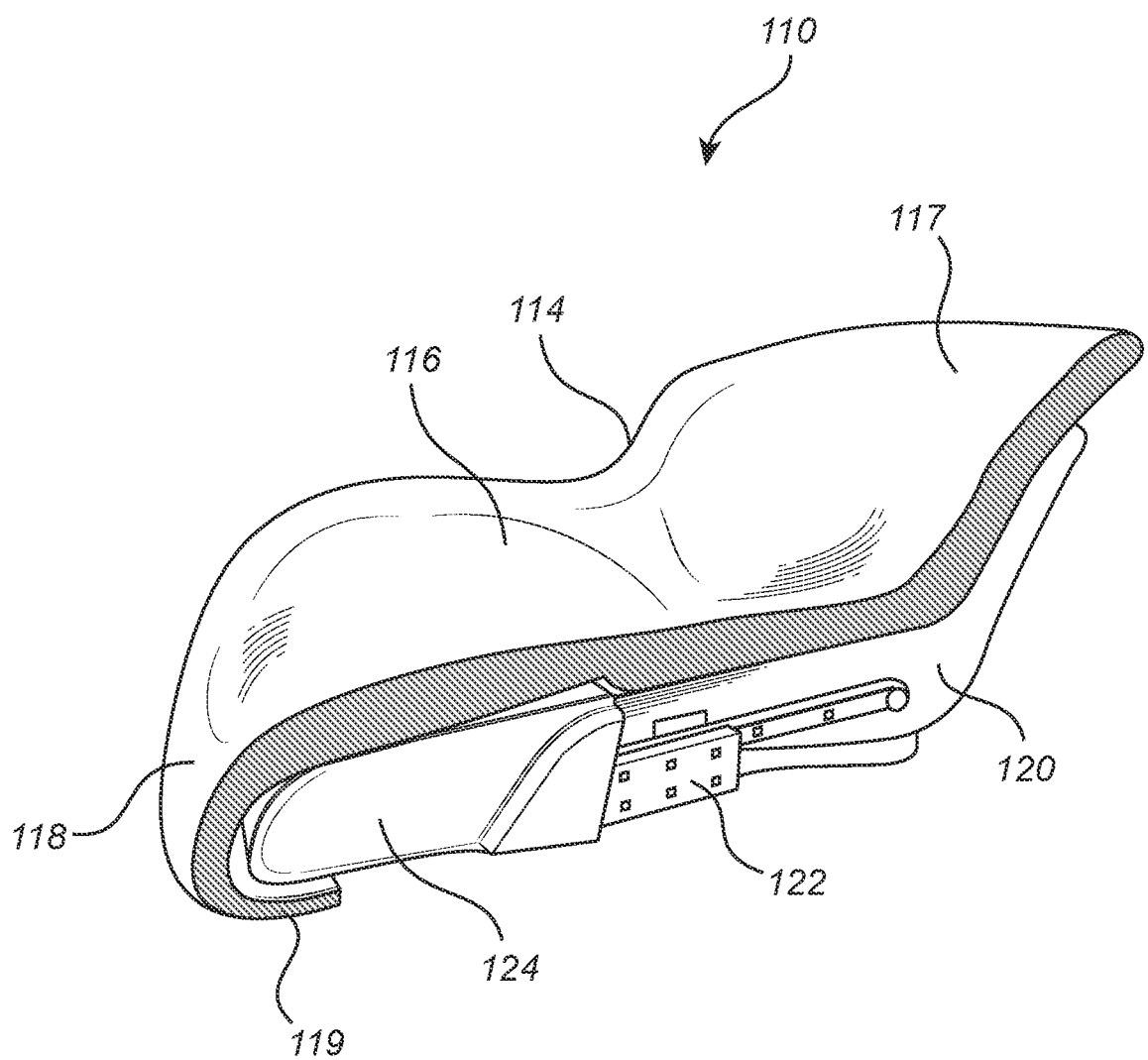
FIG. 7 is a perspective view of another illustrative embodiment of the extendable seat base of the present disclosure with the seat cover removed to highlight the seat cushion and the retractable extension portion thereof.

FIG. 7 is a perspective view of another illustrative embodiment of the seat base 110 of the present disclosure with the seat cover 112 (FIG. 1) removed to highlight the outer cushion 114 and the retractable extension thereof. Referring now specifically to FIG. 7, in embodiments, the seat base 110 is adapted to provide lumbar support for the occupant and the outer cushion 114 includes a lumber portion 117, such that the outer cushion 114 and the seat cover 112 (FIG. 1), provide a seamless configuration that extends from the lower spine of the vehicle occupant all the way to and around the front of the seat base 110. Indeed, the seamless configuration extends at least partially to a bottom of the seat base 110 as will be seen in greater detail with regard to FIG. 6.

In embodiments, the sliders 122 are telescoping sliders with one end secured to the lower shell 120 and the other end secured to the side capping 124. In some embodiments, the sliders 122 are spring loaded, such that the sliders 122 bias the side capping 124 in a forward direction.

Figure 8:
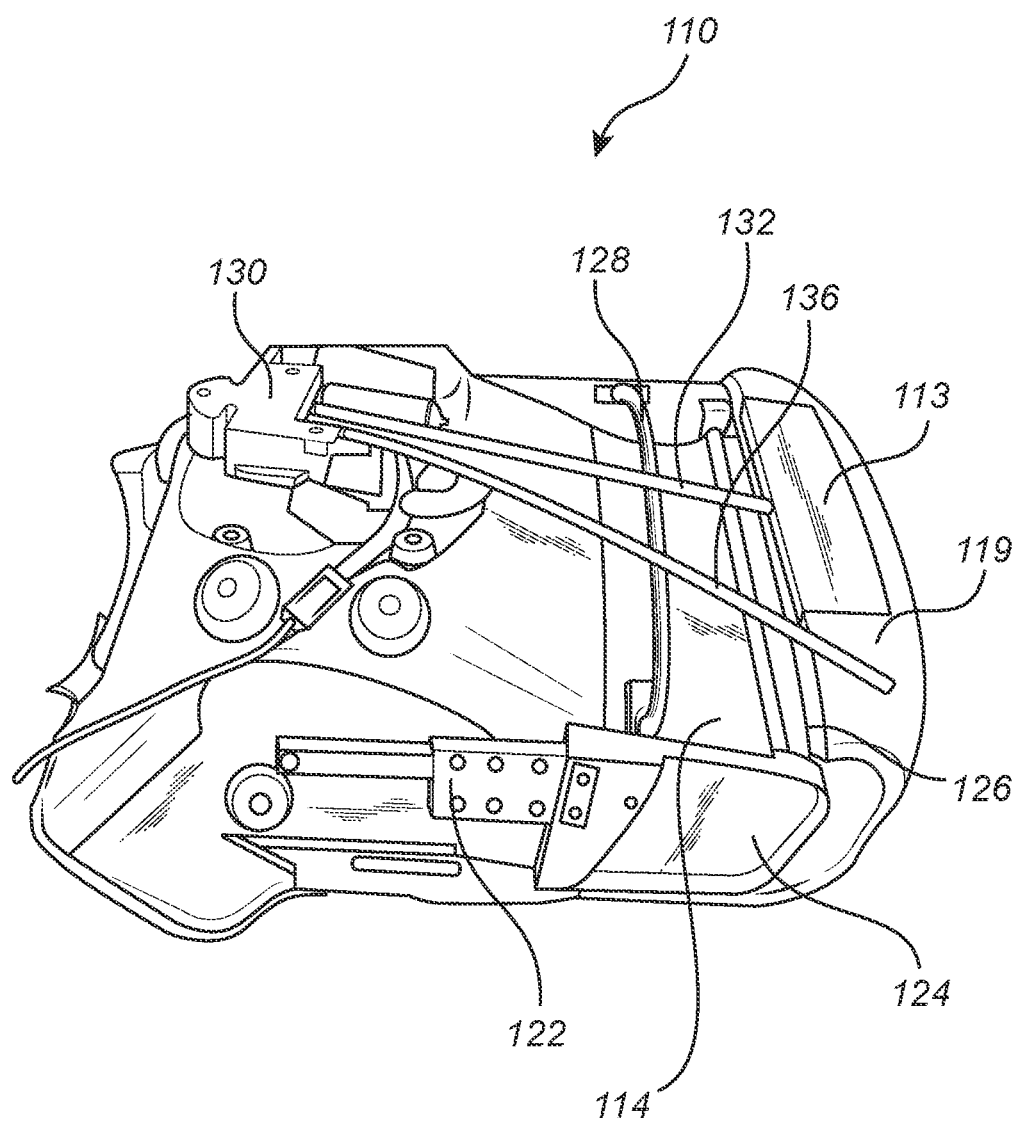
FIG. 8 is bottom perspective view of the extendable seat base of FIG. 7 of the present disclosure highlighting the retractable extension portion of the seat cushion and the supporting structure thereof.

FIG. 8 is bottom perspective view of the seat base 110 of FIG. 7 of the present disclosure highlighting the retractable extension of the outer cushion 114 and the supporting structure thereof. Referring now specifically to FIG. 8, in embodiments, the seat base 110 further includes a support rod 126. The support rod 126 is positioned under the outer cushion 114 extending across the front of the seat base 110 between the side capping 124 on each side of the seat base 110. As can be seen in FIG. 6, the support rod 126 is adapted to provide structural support for the outer cushion 114 and the seat cover 112 (FIG. 1) disposed thereover. This structure ensures that a general shape of the outer cushion 114 is maintained when the seat base 110 is in either of the standard/retracted configuration or the extended configuration. In embodiments, the support rod 126 is a bar formed of aluminum, plastic, or another substantially rigid material and is one of hollow or solid. In the embodiment illustrated, the support rod 126 is a right circular cylinder. In embodiments, the support rod 126 is adapted to support the weight of a vehicle occupant kneeling thereon to ensure the structural integrity of the seat base 110 under such circumstances.

The seat base 110 also includes a motor 130 and one or more cords 132, 136. The one or more cords 132, 136 are each one of a cable, a wire, a string, a line, and/or the like. In the embodiment illustrated, the seat base 110 includes a first cord 132 that connects either directly or indirectly to a bottom portion of the outer cushion 114 and a second cord 136 that connects to a cable connecting crossbar 128. The motor 130 is adapted to release the one or more cords 132, 136, which thereby allows the springs of the sliders 122 to push the side capping 124 and the support rod 126 forward, effectively extending the length of the seat base 110 by release. As the support rod 126 moves forward, excess material 119 of the outer cushion 114 is also pulled out and utilized as part of the extended seat base 110. The motor 130 is also adapted to pull in the one or more cords 132, 136, thereby shortening a length thereof such that the first cord 132 pulls the excess material 119 back underneath the seat base 110 and the second cord 136 pulls the side capping 124 back towards the lower shell 120, retracting the sliders 122, via the cable connecting crossbar 128. Other configurations for pulling the excess material 119 underneath the seat base 110 and for retracting the side capping 124 and sliders 122 are also contemplated herein.

In the embodiment illustrated in FIG. 8, the outer cushion 114 includes an attachment portion 113 where the first cord 132 connects to the outer cushion 114. In the embodiment illustrated, the attachment portion 113 is formed of a different material attached to the unitarily formed foam of the outer cushion 114. In these embodiments, the attachment portion 113 is formed of a material that is more resistant to tearing than that of the outer cushion 114. In other embodiments, the attachment portion 113 is part of the foam of the outer cushion 114.

Figure 9:
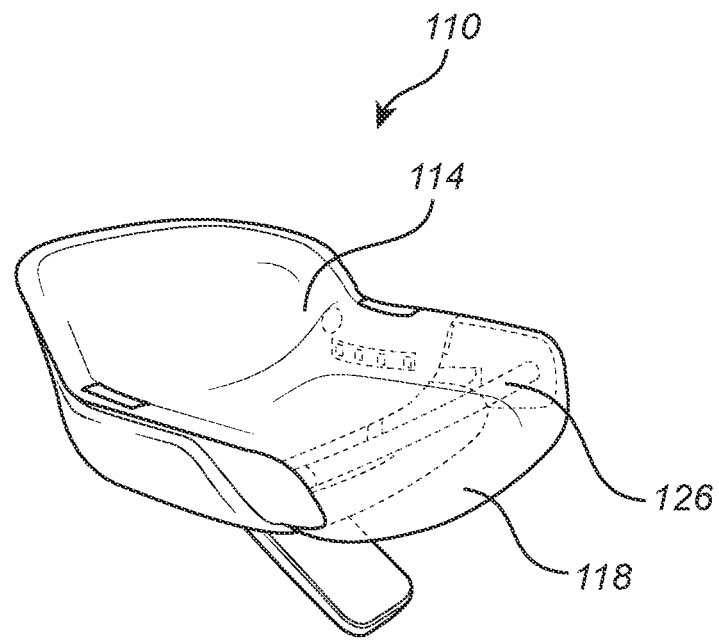
FIG. 9 is a perspective view of another illustrative embodiment of the extendable seat base of the present disclosure highlighting the support rod.
Figure 10:
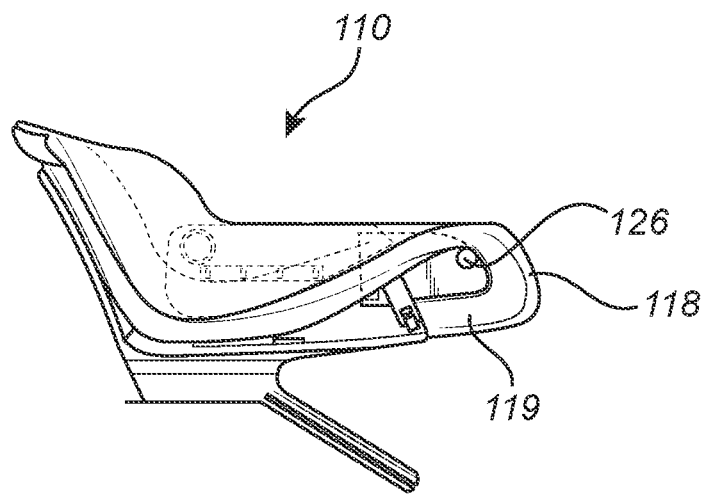
FIG. 10 is a side perspective view of the extendable seat base of FIG. 9 highlighting the support rod.

FIG. 9 is a perspective view of another illustrative embodiment of the seat base 110 of the present disclosure, highlighting the support rod 126. FIG. 10 is a side perspective view of the seat base 110 of FIG. 9, again highlighting the support rod 126. Referring now to FIGS. 9 and 10, the support rod 126 is positioned at an upper front end of the seat base 110 and provides support for the outer cushion 114. In the embodiment illustrated, the seat base 110 includes a single continuous cushion (outer cushion 114) that is supported by the lower shell 120 and the support rod 126.

Figure 11:
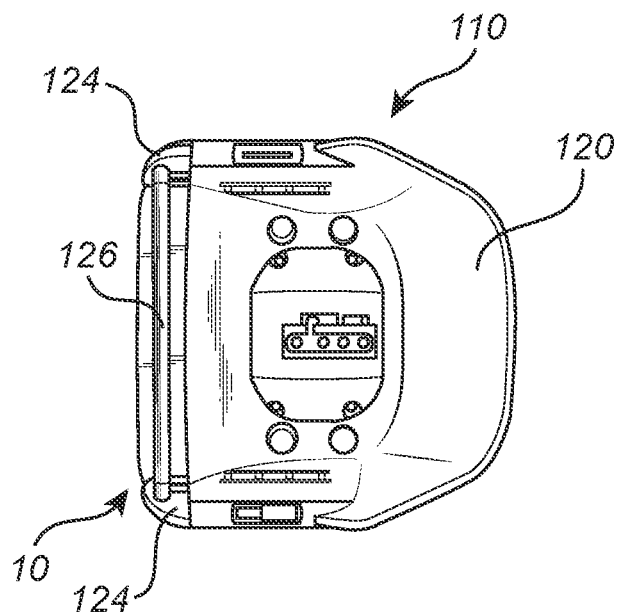
FIG. 11 is a top view of the extendable seat base of FIGS. 9 and 10 with the seat cushion removed to further highlight the support rod in a retracted position.
Figure 12:
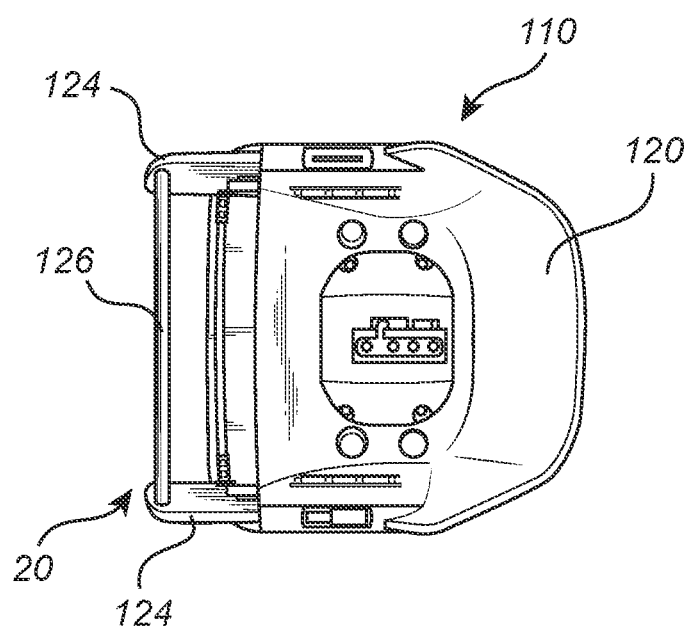
FIG. 12 is a top view of the extendable seat base of FIG. 11 with the seat cushion removed to further highlight the support rod in an extended position.

FIG. 11 is a top view of the seat base 110 of FIGS. 9 and 10 with the outer cushion 114 removed, further highlighting the support rod 126 in a retracted position. FIG. 12 is a top view of the seat base 110 of FIG. 11 again with the outer cushion 114 removed, further highlighting the support rod 126 in an extended position. Referring to FIGS. 11 and 12, the side cappings 124 and the support rod 126 are configured to move between the retracted state 10 and the extended state 20. In embodiments, the extended state 20 can be any state where the side cappings 124 and the support rod 126 are moved forward from the retracted state 10 to more adequately supported the legs of the vehicle occupant, for example.

Figure 13:
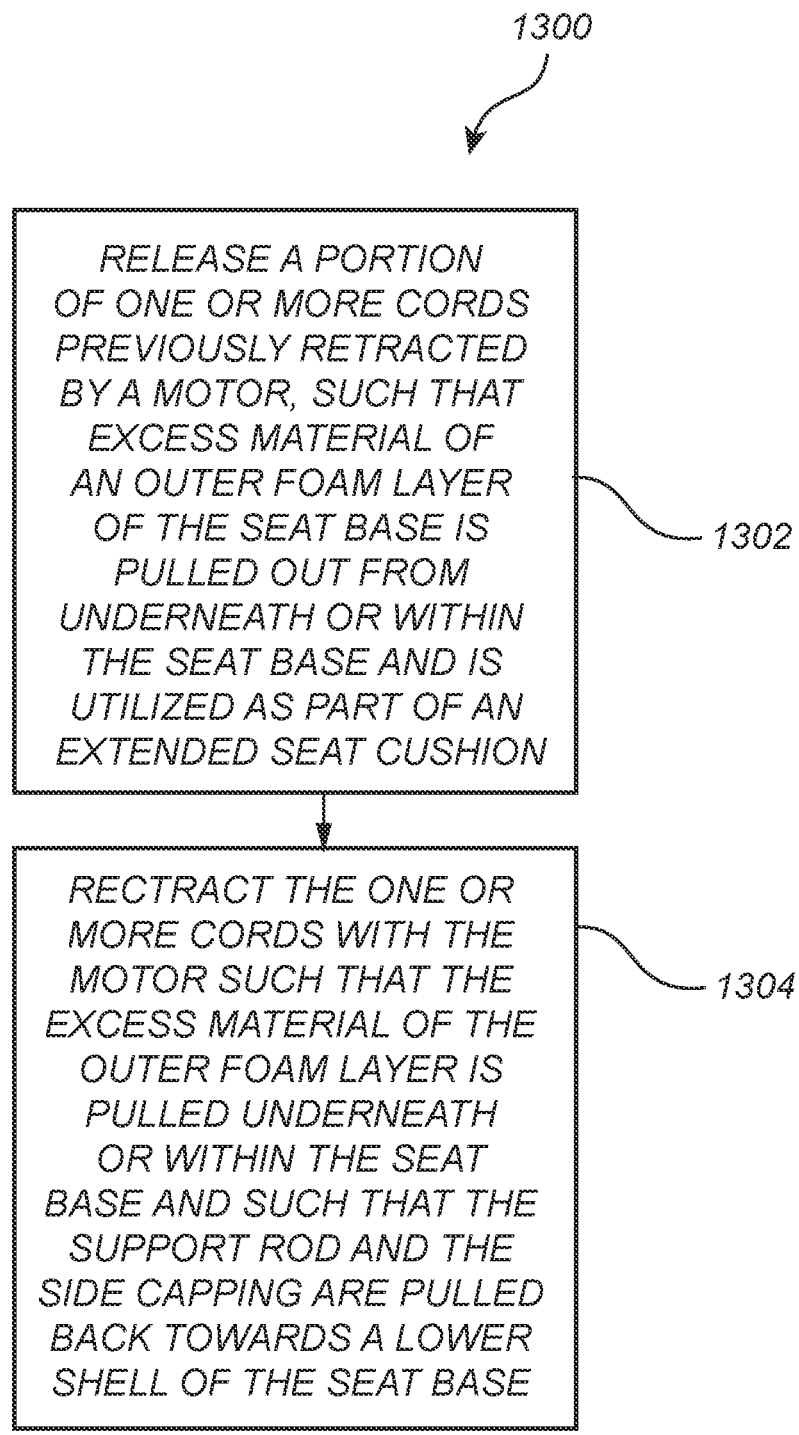
FIG. 13 is a flowchart of a method for extending a seat base of a vehicle seat.

FIG. 13 is a flowchart of a method 1300 for extending and retracting a seat base 110 of a vehicle seat. The method 1300 includes releasing a portion of one or more cords 132, 136 previously retracted by a motor 130, such that excess material 119 of an outer foam layer 114 of the seat base 110 is pulled out from underneath or within the seat base 110 and is utilized as part of an extended seat cushion at step 1302. In embodiments, the method includes releasing spring loaded sliders 122 that bias side capping 124 and a support rod 126 of the seat base 110 forward, such that there is no excess slack in the outer foam layer 114 due to the forward biasing of the side capping 124 and the support rod 126.

The method 1300 also includes retracting the one or more cords 132, 136 with the motor 130 such that the excess material 119 of the outer foam layer 114 is pulled underneath or within the seat base 110 and such that the support rod 126 and the side capping 124 are pulled back towards a lower shell 120 of the seat base 110 at step 1304. In embodiments, the springs of the spring loaded sliders 122 are compressed by the pulling back of the side capping 124 towards the lower shell 120. In some of these embodiments, the compressed springs are releasably locked in a compressed state to reduce stress on the one or more cords 132, 136 until such a time that the seat base 110 is to be extended again.

By having the outer foam layer 114 and the seat cover 112 extend out and wrap around the support rod 126 and then having excess material 119 that extends back underneath or within the seat base 110, the seat cover 112 and the outer foam layer 114 move together, along with the support rod 126, to maintain a desired shape of the seat 100, and the seat 100 can be set to any number of desired lengths with a predetermined amount of travel (based on the amount of excess material 119). Furthermore, by using spring loaded sliders 122 to bias the side capping 124 forward, the side capping 124 can also help retain the shape of the edges of the outer foam layer 114.

While the embodiment illustrated discloses that the sliders 122 are spring loaded, in other embodiments, the springs biasing the various components of the seat base 110 forward can be separate from the sliders 122.

In some embodiments, the motor 130 is controlled manually via one or more buttons on the side of the seat base 110. In other embodiments, the motor 130 is controlled by a controller of the vehicle, such that the seat 100 can be controlled via a user interface of the vehicle, presets for extended orientation of the seat base 110 can be saved for multiple occupants, and the seat base 110 can be controlled to change orientations upon startup of the vehicle, and the like.

Figure 14:
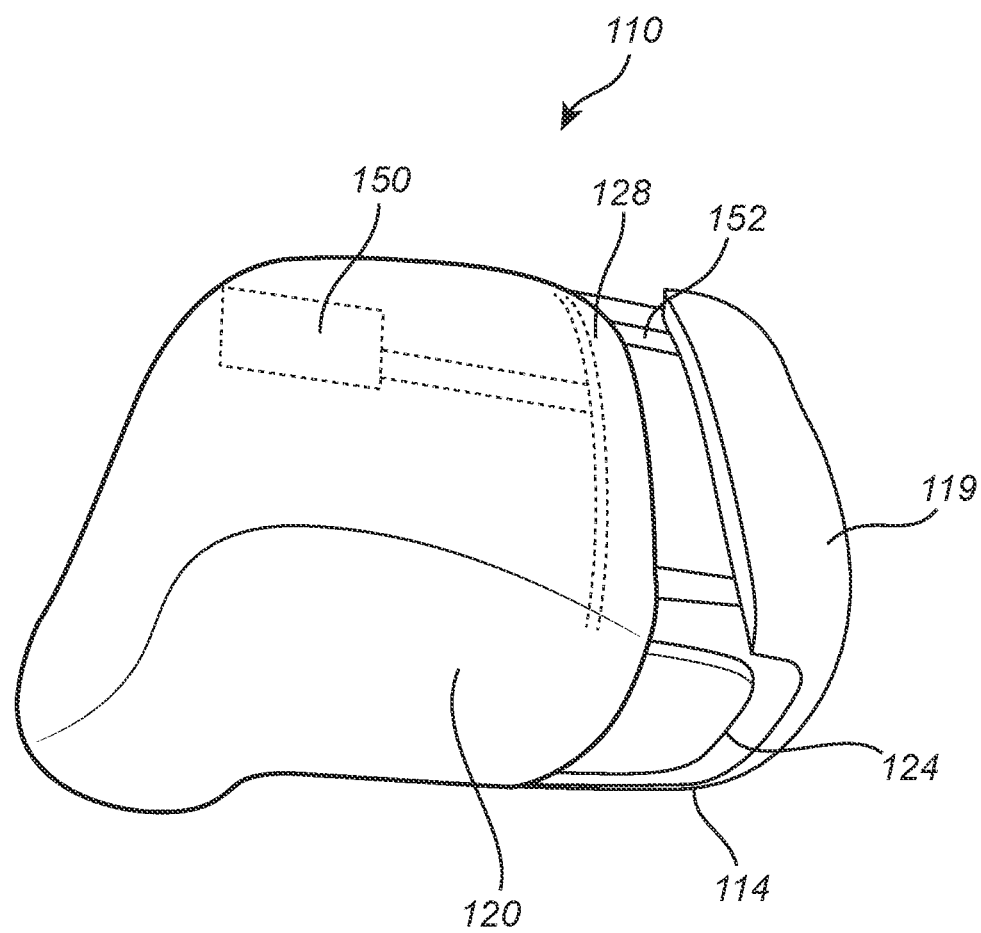
FIG. 14 is another bottom perspective view of the extendable seat base of FIG. 7 of the present disclosure highlighting another version of the retractable extension portion of the seat cushion and the supporting structure thereof.

FIG. 14 is another bottom perspective view of the seat base 110 of FIG. 7 of the present disclosure highlighting the retractable extension of the outer cushion 114 and the supporting structure thereof. Referring now specifically to FIG. 14, in another embodiment, the seat base 110 further includes the support rod 126 (FIG. 8). The support rod 126 is positioned under the outer cushion 114 extending across the front of the seat base 110 between the side capping 124 on each side of the seat base 110. As can again be seen in FIG. 6, the support rod 126 is adapted to provide structural support for the outer cushion 114 and the seat cover 112 (FIG. 1) disposed thereover. This structure ensures that a general shape of the outer cushion 114 is maintained when the seat base 110 is in either of the standard/retracted configuration or the extended configuration. In embodiments, the support rod 126 is a bar formed of aluminum, plastic, or another substantially rigid material and is one of hollow or solid. In the embodiment illustrated, the support rod 126 is a right circular cylinder. In embodiments, the support rod 126 is adapted to support the weight of a vehicle occupant kneeling thereon to ensure the structural integrity of the seat base 110 under such circumstances.

Here, the side capping 124 is not biased forwards or backwards to any extent, but the connecting crossbar 128 still extends across the seat base 110 between the side capping 124 on each side of the seat base 110. An actuator 150 is coupled to the connecting crossbar 128 and serves to translate the connecting crossbar 128 forwards and backwards initially, thereby translating the side capping 124 forwards and backwards in unison, as well as the connected support rod 126. This translation of the connecting crossbar 128, the side capping 124, and the support rod 126 extends and retracts the outer cushion 114 of the seat base 110, without the use of a separate motor and cord as provided herein above. In this embodiment, the excess material 119 is continuously biased under or within the seat base 110 by an elastic member 152 coupled between the excess material 119 and the lower shell 120. This biasing occurs whether the seat base 110 in an extended configuration or a retracted configuration, while still allowing the desired translation to occur, without slack in the outer cushion 114. The elastic member 152 may be, for example, an elastic loop that is coupled to the outer cushion 114 at two separate side locations and be wrapped around a portion of the lower shell 120. The elastic member 152 serves to pull the excess material 119 underneath or within the seat base 110 when the seat base 110 is in any configuration, to a greater or lesser extent.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A seat base for a seat of a vehicle, the seat base comprising:
    an outer cushion forming a top of the seat base extending, in one unitarily formed piece, down a front of the seat base and back underneath or within the seat base, such that excess material of the outer cushion is disposed underneath or within the seat base; and
    a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration,
    wherein the mechanism comprises:
        a cord connected directly or indirectly to an end of the outer cushion at the excess material; and
        a motor adapted to pull or release the cord and thereby pull the excess material in the retracted configuration or release the excess material in the extended configuration.

2. The seat base of claim 1, further comprising a cover disposed about the outer cushion forming, at least in part, a seating surface for the vehicle occupant.

3. The seat base of claim 2, wherein the cover comprises one unitarily formed piece.

4. The seat base of claim 1, further comprising a shell disposed underneath at least a back portion of the outer cushion and side capping members disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion.

5. The seat base of claim 4, wherein the side capping members are biased away from the shell in the extended configuration of the seat base by one or more spring members.

6. The seat base of claim 4, wherein the mechanism comprises:
    a cord connected to a crossbar coupled between the side capping members; and
    the motor adapted to pull or release the cord and thereby pull the excess material in the retracted configuration or release the excess material in the extended configuration as the side capping members are translated.

7. The seat base of claim 1, wherein the mechanism comprises:
    a shell disposed underneath at least a back portion of the outer cushion and side capping members disposed on either side of a front portion of the outer cushion, wherein the side capping members are each coupled to the shell via a slider member enabling the side capping members to translate towards and away from the shell, and wherein the side capping members are coupled to each other via a crossbar and a support rod disposed through an interior space defined by the outer cushion;
    wherein the motor is an actuator coupled to the crossbar and adapted to translate the side capping members and the support rod towards and away from the shell within the outer cushion; and
    an elastic member connected directly or indirectly to an end of the outer cushion at the excess material and adapted bias the excess material towards the shell in all configurations.

8. A seat of a vehicle, the seat comprising:
    a seat base, comprising:
        an outer cushion forming a top of the seat base extending, in one unitarily formed piece, down a front of the seat base and back underneath or within the seat base, such that excess material of the outer cushion is disposed underneath or within the seat base; and
        a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration,
        wherein the mechanism comprises:
            a cord connected directly or indirectly to an end of the outer cushion at the excess material; and
            a motor adapted to pull or release the cord and thereby pull the excess material in the retracted configuration or release the excess material in the extended configuration;
    a backrest pivotably coupled to the seat base; and
    a headrest extendably coupled to the backrest.

9. The seat of claim 8, wherein the seat base further comprises a cover disposed about the outer cushion forming, at least in part, a seating surface for the vehicle occupant.

10. The seat of claim 9, wherein the cover comprises one unitarily formed piece.

11. The seat of claim 8, wherein the seat base further comprises a shell disposed underneath at least a back portion of the outer cushion and side capping members disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion.

12. The seat of claim 11, wherein the side capping members are biased away from the shell in the extended configuration of the seat base by one or more spring members.

13. The seat of claim 11, wherein the mechanism comprises:
    a cord connected to a crossbar coupled between the side capping members; and
    the motor adapted to pull or release the cord and thereby pull the excess material in the retracted configuration or release the excess material in the extended configuration as the side capping members are translated.

14. The seat of claim 8, wherein the mechanism comprises:
- a shell disposed underneath at least a back portion of the outer cushion and side capping members disposed on either side of a front portion of the outer cushion, wherein the side capping members are each coupled to the shell via a slider member enabling the side capping members to translate towards and away from the shell, and wherein the side capping members are coupled to each other via a crossbar and a support rod disposed through an interior space defined by the outer cushion;
- wherein the motor is an actuator coupled to the crossbar and adapted to translate the side capping members and the support rod towards and away from the shell within the outer cushion; and
- an elastic member connected directly or indirectly to an end of the outer cushion at the excess material and adapted bias the excess material towards the shell in all configurations.

15. A seat base for a seat of a vehicle, the seat base comprising:
- an outer cushion forming a top of the seat base extending, in one unitarily formed piece, down a front of the seat base and back underneath or within the seat base, such that excess material of the outer cushion is disposed underneath or within the seat base;
- a mechanism adapted to pull the excess material underneath or within the seat base when the seat base is in a retracted configuration and to release the excess material from underneath or within the seat base when the seat base is in an extended configuration, wherein at least a portion of the excess material is used to form part of an extended seat for a vehicle occupant when the seat base is in the extended configuration; and
- a shell disposed underneath at least a back portion of the outer cushion and side capping members disposed on either side of a front portion of the outer cushion, wherein the side capping members are each coupled to the shell via a slider member enabling the side capping members to translate towards and away from the shell, and wherein the side capping members are coupled to each other via a support rod disposed through an interior space defined by the outer cushion;

wherein the mechanism comprises one of:
- a cord connected to a crossbar coupled between the side capping members and a motor adapted to pull or release the cord and thereby pull the excess material in the retracted configuration or release the excess material in the extended configuration as the side capping members are translated, and
- an actuator coupled to the crossbar and adapted to translate the side capping members and the support rod towards and away from the shell within the outer cushion and an elastic member connected directly or indirectly to an end of the outer cushion at the excess material and adapted bias the excess material towards the shell in all configurations.

16. The seat base of claim 15, further comprising a cover disposed about the outer cushion forming, at least in part, a seating surface for the vehicle occupant.

17. The seat base of claim 16, wherein the cover comprises one unitarily formed piece.

18. The seat base of claim 15, wherein the mechanism comprises:
- a cord connected directly or indirectly to an end of the outer cushion at the excess material; and
- the motor adapted to pull or release the cord and thereby pull the excess material in the retracted configuration or release the excess material in the extended configuration.

19. The seat base of claim 15, wherein the side capping members are biased away from the shell in the extended configuration of the seat base by one or more spring members.

* * * * *